(12) United States Patent
Zhang et al.

(10) Patent No.: US 9,582,433 B2
(45) Date of Patent: Feb. 28, 2017

(54) DISK ARRAY FLUSHING METHOD AND DISK ARRAY FLUSHING APPARATUS

(71) Applicant: Huawei Technologies Co., Ltd., Shenzhen (CN)

(72) Inventors: Xiang Zhang, Chengdu (CN); Hao Dong, Chengdu (CN); Quan Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/752,077

(22) Filed: Jun. 26, 2015

(65) Prior Publication Data

US 2015/0293856 A1    Oct. 15, 2015

Related U.S. Application Data

(63) Continuation of application No. PCT/CN2012/087506, filed on Dec. 26, 2012.

(51) Int. Cl.
*G06F 12/12* (2016.01)
*G06F 3/06* (2006.01)
(Continued)

(52) U.S. Cl.
CPC .............. *G06F 12/121* (2013.01); *G06F 3/00* (2013.01); *G06F 3/061* (2013.01); *G06F 3/0644* (2013.01);
(Continued)

(58) Field of Classification Search
CPC ........ G06F 3/0689; G06F 3/0644; G06F 3/00; G06F 3/061; G06F 12/121; G06F 12/0804; G06F 12/868
(Continued)

(56) References Cited

U.S. PATENT DOCUMENTS

2004/0230742 A1   11/2004   Ikeuchi et al.
2006/0294301 A1   12/2006   Zohar et al.
(Continued)

FOREIGN PATENT DOCUMENTS

CN   101458668 A   6/2009
CN   101526882 A   9/2009
(Continued)

OTHER PUBLICATIONS

Foreign Communication From a Counterpart Application, European Application No. 12890699.7, Extended European Search Report dated Nov. 19, 2015, 8 pages.
(Continued)

*Primary Examiner* — Jasmine Song
(74) *Attorney, Agent, or Firm* — Conley Rose, P.C.

(57) ABSTRACT

A disk array flushing method and a disk array flushing apparatus. The method includes acquiring a sequence, which is according to physical addresses of logical units, of the logical units in a same redundant array of independent disks (RAID) group in a disk array, and sequentially flushing, according to the sequence of the logical units, concurrent flushing input-outputs (IOs) of the RAID group to the logical units in the RAID group. According to the disk array flushing method and the disk array flushing apparatus, by uniformly scheduling logical units in a single RAID group and performing flushing according to a sequence of physical addresses, it takes less time for a magnetic arm to jump back and forth for addressing, and influences between RAID groups are prevented by means of independent control over the RAID groups, thereby improving flushing efficiency of a disk array, and increasing throughput of the disk array.

16 Claims, 3 Drawing Sheets

(51) Int. Cl.
   *G06F 3/00* (2006.01)
   *G06F 12/08* (2016.01)
(52) U.S. Cl.
   CPC ......... *G06F 3/0689* (2013.01); *G06F 12/0804* (2013.01); *G06F 12/0868* (2013.01); *G06F 2212/69* (2013.01)
(58) Field of Classification Search
   USPC ........................................................ 711/114
   See application file for complete search history.

(56) References Cited

U.S. PATENT DOCUMENTS

| | | |
|---|---|---|
| 2007/0220201 A1 | 9/2007 | Gill et al. |
| 2011/0252201 A1 | 10/2011 | Koren et al. |

FOREIGN PATENT DOCUMENTS

| | | |
|---|---|---|
| JP | H05303528 A | 11/1993 |
| JP | 2004295860 A | 10/2004 |
| JP | 2010160544 A | 7/2010 |
| WO | 2011121590 A1 | 10/2011 |

OTHER PUBLICATIONS

Partial English Translation and Abstract of Chinese Patent Application No. CN101458668, Jun. 27, 2015, 5 pages.
Foreign Communication From a Counterpart Application, PCT Application No. PCT/CN2012/087506, English Translation of International Search Report dated Oct. 17, 2013, 2 pages.
Foreign Communication From a Counterpart Application, PCT Application No. PCT/CN2012/087506, English Translation of Written Opinion dated Oct. 17, 2013, 8 pages.
Partial English Translation and Abstract of Japanese Patent Application No. JPA2004295860, Aug. 19, 2016, 62 pages.
Partial English Translation and Abstract of Japanese Patent Application No. JPA2010160544, Aug. 19, 2016, 40 pages.
Partial English Translation and Abstract of Japanese Patent Application No. JPH05303528, Aug. 19, 2016, 22 pages.
Foreign Communication From a Counterpart Application, Japanese Application No. 2015-549916, Japanese Office Action dated Jul. 19, 2016, 3 pages.
Foreign Communication From a Counterpart Application, Japanese Application No. 2015-549916, English Translation of Japanese Office Action dated Jul. 19, 2016, 4 pages.
"Pointer, (computer programming)," From Wikipedia, the free encyclopedia, https://en.wikipedia.org/wiki/Pointer_(computer_programming), Nov. 22, 2016, 18 pages.

DISK ARRAY FLUSHING METHOD AND DISK ARRAY FLUSHING APPARATUS

CROSS-REFERENCE TO RELATED APPLICATIONS

This application is a continuation of International Application No. PCT/CN2012/087506, filed on Dec. 26, 2012, which is hereby incorporated by reference in their entireties.

TECHNICAL FIELD

Embodiments of the present invention relate to computer technologies, and in particular, to a disk array flushing method and disk array flushing apparatus.

BACKGROUND

With the rapid development of computer application technologies, massive data is generated, which results in higher requirements on storage space and performance. Because operations on a current mainstream disk still include a large number of mechanical operations, a gap exists between performance of the current mainstream disk and that of a processor and a memory. A cache technology is applied to the storage field, which not only can hide a host delay, but also can integrate data, and data is written to a disk in a disk-friendly manner by using a CACHE, that is, the disk is flushed, thereby achieving optimum throughput of a storage system.

After decades of research, an existing CACHE algorithm becomes mature. However, applications provided by computers become diversified day by day, and both space and performance provided by a disk array need a more flexible scheduling method. A same disk array usually may include disks of different types, and even in redundant array of independent disks (RAID) groups that include disks of a same type, the number of member disks included in each RAID group is usually different. Moreover, the number of logical units identified by using logical unit numbers (LUN) in a single RAID group also gradually increases.

In the prior art, during flushing of a disk array, scheduling is performed in a logical unit layer, that is, each flushing input/output (IO) is for a single logical unit. However, a disk array includes multiple RAID groups, and each RAID group further includes multiple logical units; a current disk array flushing method cannot properly work in this situation. For example, for multiple logical units in a same RAID group, flushing IOs for a single logical unit are ordered flushing IOs in the logical unit; however, because concurrent flushing needs to be performed on multiple logical units, and the multiple logical units on which the concurrent flushing is performed have a discrete sequence, concurrent flushing IOs in the whole RAID group are usually discrete. Concurrent flushing IOs that are discrete may cause a magnetic arm of a disk to jump back and forth for addressing, and a lot of time is spent in addressing by the magnetic arm rather than data reading and writing, leading to a severe negative effect on overall performance of the disk array, and low throughput of the disk array.

SUMMARY

Embodiments of the present invention provide a disk array flushing method and a disk array flushing apparatus, which are used to improve flushing efficiency of a disk array, and increase throughput of the disk array.

According to a first aspect, an embodiment of the present invention provides a disk array flushing method, including acquiring a sequence, which is according to physical addresses of logical units, of the logical units in a same RAID group in a disk array; and sequentially flushing, according to the sequence of the logical units, concurrent flushing IOs of the RAID group to the logical units in the RAID group, where each concurrent flushing IO includes at least one dirty page to be flushed to one logical unit in the RAID group.

In a first possible implementation manner of the first aspect, before the sequentially flushing, according to the sequence of the logical units, concurrent flushing IOs of the RAID group to the logical units in the RAID group, the method further includes determining the number of concurrent flushing IOs of the RAID group according to a total number of dirty pages to be flushed to the disk array, a total number of dirty pages to be flushed to the RAID group, and a concurrent flushing upper limit of the RAID group.

According to the first possible implementation manner of the first aspect, in a second possible implementation manner of the first aspect, the determining the number of concurrent flushing IOs of the RAID group according to a total number of dirty pages to be flushed to the disk array, a total number of dirty pages to be flushed to the RAID group, and a concurrent flushing upper limit of the RAID group includes determining the number $d_n = M \times (p_n/P) \times (1-U)$ of concurrent flushing IOs of the RAID group, where M is the concurrent flushing upper limit of the RAID group, $p_n$ is the total number of dirty pages to be flushed to the RAID group, P is the total number of dirty pages to be flushed to the disk array, and U is a current utilization rate of the disk array.

According to the first aspect or one of the foregoing two possible implementation manners of the first aspect, in a third possible implementation manner of the first aspect, the sequentially flushing, according to the sequence of the logical units, concurrent flushing IOs of the RAID group to the logical units in the RAID group includes performing traversing from a current logical unit to which a flushing pointer of the RAID group points; and if the dirty pages to be flushed to the RAID group do not include a dirty page to be flushed to the current logical unit, pointing the flushing pointer of the RAID group to another logical unit that is arranged next to the current logical unit according to the sequence of the physical addresses; or if the dirty pages to be flushed to the RAID group include a dirty page to be flushed to the current logical unit, flushing the current logical unit.

According to the third possible implementation manner of the first aspect, in a fourth possible implementation manner of the first aspect, the flushing the current logical unit includes, if the number of completed concurrent flushing IOs of the current logical unit does not reach a concurrent flushing upper limit of the current logical unit, flushing a dirty page in a concurrent flushing IO corresponding to the current logical unit to the current logical unit; and if the number of completed concurrent flushing IOs of the current logical unit reaches the concurrent flushing upper limit of the current logical unit, stopping flushing the current logical unit, and pointing the flushing pointer of the RAID group to another logical unit that is arranged next to the current logical unit according to the sequence of the physical addresses.

According to the third or fourth possible implementation manner of the first aspect, in a fifth possible implementation manner of the first aspect, the flushing the current logical unit includes, if the number of completed concurrent flushing IOs of the RAID group does not reach the concurrent flushing upper limit of the RAID group, flushing the current logical unit; and if the number of completed concurrent flushing IOs of the RAID group reaches the concurrent flushing upper limit of the RAID group, stopping flushing the RAID group.

According to the fifth possible implementation manner of the first aspect, in a sixth possible implementation manner of the first aspect, after the stopping flushing the RAID group, the method further includes keeping the flushing pointer of the RAID group unchanged.

According to a second aspect, an embodiment of the present invention provides a disk array flushing apparatus, including:

an acquisition module configured to acquire a sequence, which is according to physical addresses of logical units, of the logical units in a same RAID group in a disk array; and a flushing module configured to sequentially flush, according to the sequence of the logical units, concurrent flushing IOs of the RAID group to the logical units in the RAID group, where each concurrent flushing IO includes at least one dirty page to be flushed to one logical unit in the RAID group.

In a first possible implementation manner of the second aspect, the apparatus further includes a determining module configured to determine the number of concurrent flushing IOs of the RAID group according to a total number of dirty pages to be flushed to the disk array, a total number of dirty pages to be flushed to the RAID group, and a concurrent flushing upper limit of the RAID group.

According to the first possible implementation manner of the second aspect, in a second possible implementation manner of the second aspect, the determining module is configured to determine the number $d_n = M \times (p_n/P) \times (1-U)$ of concurrent flushing IOs of the RAID group, where M is the concurrent flushing upper limit of the RAID group, $p_n$ is the total number of dirty pages to be flushed to the RAID group, P is the total number of dirty pages to be flushed to the disk array, and U is a current utilization rate of the disk array.

According to the second aspect or one of the foregoing two possible implementation manners of the second aspect, in a third possible implementation manner of the second aspect, the flushing module is configured to perform traversing from a current logical unit to which a flushing pointer of the RAID group points; and if the dirty pages to be flushed to the RAID group do not include a dirty page to be flushed to the current logical unit, point the flushing pointer of the RAID group to another logical unit that is arranged next to the current logical unit according to the sequence of the physical addresses; or if the dirty pages to be flushed to the RAID group include a dirty page to be flushed to the current logical unit, flush the current logical unit.

According to the third possible implementation manner of the second aspect, in a fourth possible implementation manner of the second aspect, that the flushing module is configured to flush the current logical unit specifically includes, if the number of completed concurrent flushing IOs of the current logical unit does not reach a concurrent flushing upper limit of the current logical unit, flushing a dirty page in a concurrent flushing IO corresponding to the current logical unit to the current logical unit; and if the number of completed concurrent flushing IOs of the current logical unit reaches the concurrent flushing upper limit of the current logical unit, stopping flushing the current logical unit, and pointing the flushing pointer of the RAID group to another logical unit that is arranged next to the current logical unit according to the sequence of the physical addresses.

According to the third or fourth possible implementation manner of the second aspect, in a fifth possible implementation manner of the second aspect, the flushing module is further configured to, if the number of completed concurrent flushing IOs of the RAID group does not reach the concurrent flushing upper limit of the RAID group, flush the current logical unit; and if the number of completed concurrent flushing IOs of the RAID group reaches the concurrent flushing upper limit of the RAID group, stop flushing the RAID group.

According to the fifth possible implementation manner of the second aspect, in a sixth possible implementation manner of the second aspect, the flushing module is further configured to keep the flushing pointer of the RAID group unchanged.

According to a third aspect, an embodiment of the present invention provides another disk array flushing apparatus, including a memory configured to store an instruction, a processor, coupled to the memory, where the processor is configured to execute the instruction stored in the memory, where the processor is configured to acquire a sequence, which is according to physical addresses of logical units, of the logical units in a same RAID group in a disk array; and sequentially flush, according to the sequence of the logical units, concurrent flushing IOs of the RAID group to the logical units in the RAID group, where each concurrent flushing IO includes at least one dirty page to be flushed to one logical unit in the RAID group.

In a first possible implementation manner of the third aspect, the processor is configured to determine the number of concurrent flushing IOs of the RAID group according to a total number of dirty pages to be flushed to the disk array, a total number of dirty pages to be flushed to the RAID group, and a concurrent flushing upper limit of the RAID group.

According to the first possible implementation manner of the third aspect, in a second possible implementation manner of the third aspect, the processor is configured to determine the number $d_n = M \times (p_n/P) \times (1-U)$ of concurrent flushing IOs of the RAID group, where M is the concurrent flushing upper limit of the RAID group, $p_n$ is the total number of dirty pages to be flushed to the RAID group, P is the total number of dirty pages to be flushed to the disk array, and U is a current utilization rate of the disk array.

According to the third aspect or one of the foregoing two possible implementation manners of the third aspect, in a third possible implementation manner of the third aspect, the processor is specifically configured to perform traversing from a current logical unit to which a flushing pointer of the RAID group points; and if the dirty pages to be flushed to the RAID group do not include a dirty page to be flushed to the current logical unit, point the flushing pointer of the RAID group to another logical unit that is arranged next to the current logical unit according to the sequence of the physical addresses; or if the dirty pages to be flushed to the RAID group include a dirty page to be flushed to the current logical unit, flush the current logical unit.

According to the third possible implementation manner of the third aspect, in a fourth possible implementation manner of the third aspect, that the processor is configured to flush the current logical unit specifically includes, if the number of completed concurrent flushing IOs of the current logical unit does not reach a concurrent flushing upper limit of the current logical unit, flushing a dirty page in a concurrent flushing IO corresponding to the current logical unit to the current logical unit; and if the number of completed concurrent flushing IOs of the current logical unit reaches the concurrent flushing upper limit of the current logical unit, stopping flushing the current logical unit, and pointing the flushing pointer of the RAID group to another logical unit that is arranged next to the current logical unit according to the sequence of the physical addresses.

According to the third or fourth possible implementation manner of the third aspect, in a fifth possible implementation manner of the third aspect, the processor is further configured to, if the number of completed concurrent flushing IOs of the RAID group does not reach the concurrent flushing upper limit of the RAID group, flush the current logical unit; and if the number of completed concurrent flushing IOs of the RAID group reaches the concurrent flushing upper limit of the RAID group, stop flushing the RAID group.

According to the fifth possible implementation manner of the third aspect, in a sixth possible implementation manner of the third aspect, the processor is further configured to keep the flushing pointer of the RAID group unchanged.

According to the disk array flushing method and the disk array flushing apparatus provided in the embodiments of the present invention, by uniformly scheduling multiple logical units in a single RAID group and performing flushing according to a sequence of physical addresses, it takes less time for a magnetic arm to jump back and forth for addressing, and influences between RAID groups are prevented by means of independent control over the RAID groups, thereby improving flushing efficiency of a disk array, and increasing throughput of the disk array.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

Figure 1:
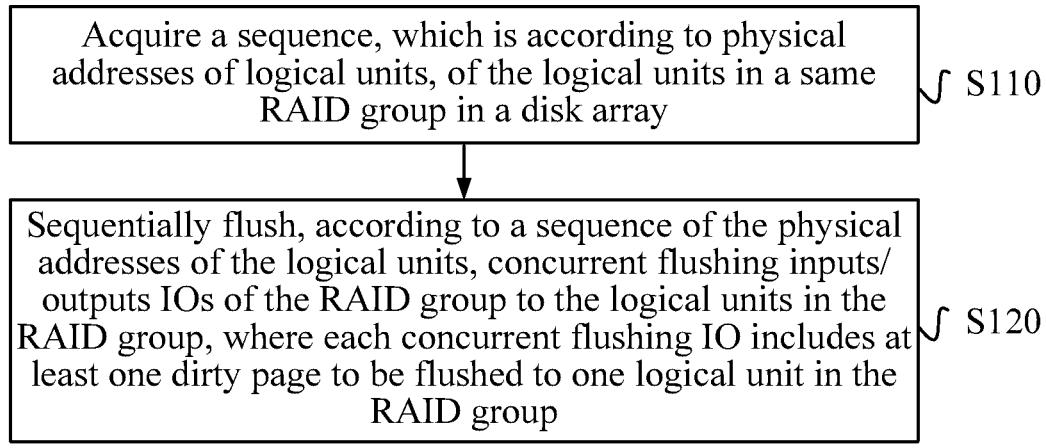
FIG. 1 is a flowchart of Embodiment 1 of a disk array flushing method according to the present invention.

FIG. 1 is a flowchart of Embodiment 1 of a disk array flushing method according to the present invention. As shown in FIG. 1, the disk array flushing method according to this embodiment may include:

Step S110: Acquire a sequence, which is according to physical addresses of logical units, of the logical units in a same RAID group in a disk array.

The disk array may include multiple RAID groups, each RAID group may include multiple logical units, the logical units may be identified by using LUNs, and the logical units are used to divide storage space in the RAID group. Generally, when logical units are created, storage space may be divided for all logical units in a same RAID group according to a sequence of physical addresses of the logical units in the RAID group, and each logical unit occupies space of consecutive physical addresses in the RAID group. For example, a sequence of LUN 1 to LUN 5 according to physical addresses may be LUN 2, LUN 4, LUN 1, LUN 5, LUN 3.

Step S120: Sequentially flush, according to the sequence of the logical units, concurrent flushing IOs of the RAID group to the logical units in the RAID group, where each concurrent flushing IO includes at least one dirty page to be flushed to one logical unit in the RAID group.

One concurrent flushing IO of a RAID group may include one or more dirty pages needing to be flushed to a same logical unit in the RAID group, and one concurrent flushing IO of the RAID group can be construed as one flushing operation of flushing a dirty page in the concurrent flushing IO to the RAID group. Generally, dirty pages to be flushed to the RAID group are continuously packaged according to a sequence of destination addresses corresponding to the dirty pages, to form concurrent flushing IOs, and a destination address of a dirty page is corresponding to a physical address of a logical unit to which the dirty page is to be written. Flushing is separately performed on RAID groups, and during the flushing, the RAID groups do not interfere with each other. Concurrent flushing IOs in a RAID group are separately flushed to logical units of the RAID group according to a sequence. If the sequence is consistent with an arrangement sequence of physical addresses of the logical units in the RAID group, because the physical addresses of the logical units in the RAID group are consecutive, a process of flushing the concurrent flushing IOs of the RAID group to the RAID group is a process in which a magnetic arm in the RAID group performs sequential addressing and writes dirty pages to a disk.

According to the disk array flushing method provided in this embodiment of the present invention, by uniformly scheduling logical units in a single RAID group and performing flushing according to a sequence of physical addresses, it takes less time for a magnetic arm to jump back and forth for addressing, and influences between RAID groups are prevented by means of independent control over the RAID groups, thereby improving flushing efficiency of a disk array, and increasing throughput of the disk array.

Figure 2:
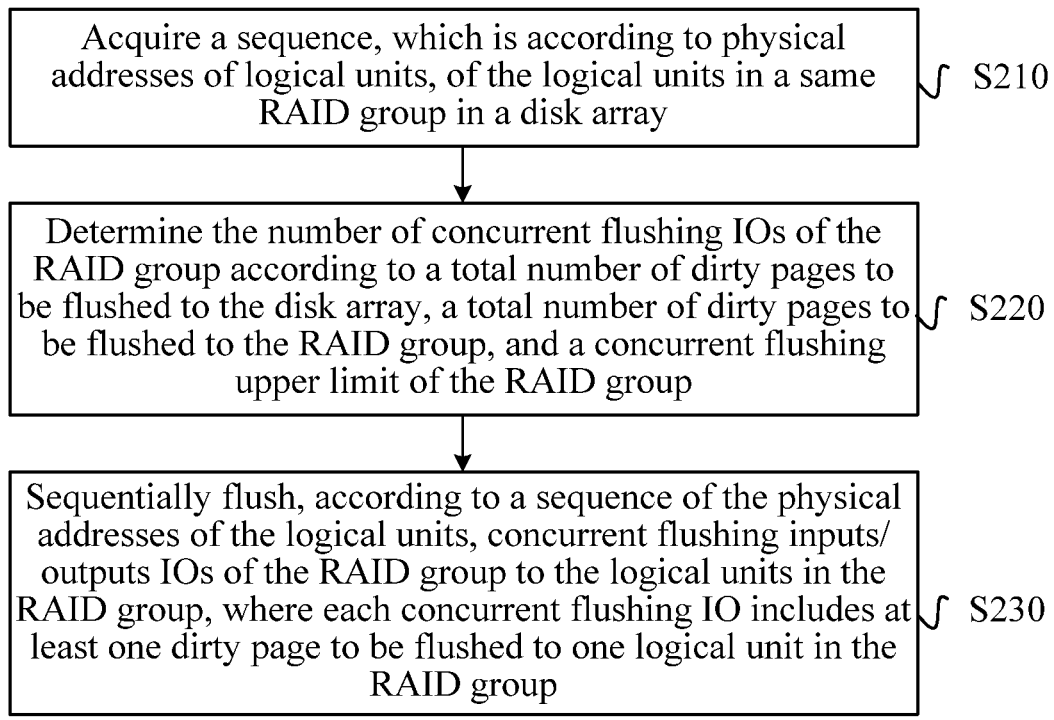
FIG. 2 is a flowchart of Embodiment 2 of a disk array flushing method according to the present invention.

FIG. 2 is a flowchart of Embodiment 2 of a disk array flushing method according to the present invention. As shown in FIG. 2, the disk array flushing method according to this embodiment may include:

Step S210: Acquire a sequence, which is according to physical addresses of logical units, of the logical units in a same RAID group in a disk array.

The disk array may include multiple RAID groups, each RAID group may include multiple logical units, the logical units may be identified by using LUNs, and the logical units are used to divide storage space in the RAID group. Generally, when logical units are created, storage space may be divided for all logical units in a same RAID group according to a sequence of physical addresses of the logical units in the RAID group, and each logical unit occupies space of consecutive physical addresses in the RAID group.

Step S220: Determine the number of concurrent flushing IOs of the RAID group according to a total number of dirty pages to be flushed to the disk array, a total number of dirty pages to be flushed to the RAID group, and a concurrent flushing upper limit of the RAID group.

This step may also be performed before step S210. The dirty pages to be flushed to the disk array are data that has been written to a CACHE but has not been written to the disk array. If the number of dirty pages in the CACHE exceeds a high watermark, that is, space for storing dirty pages in the CACHE is to be exhausted, the concurrent flushing upper limit of each RAID group is used as the number of concurrent flushing IOs of the RAID group. If the number of dirty pages in the CACHE does not reach the high watermark, the number of concurrent flushing IOs of the logical units in the RAID group in current flushing may be determined according to a ratio of the total number of dirty pages to be flushed to the RAID group to the total number of dirty pages to be flushed to the disk array, the concurrent flushing upper limit of the RAID group, and a busy/idle degree of the disk array. The concurrent flushing upper limit of the RAID group is an upper limit of the number of flushing IOs that can be performed in the RAID group in each concurrent flushing, and the concurrent flushing upper limit of the RAID group is determined according to types of member disks of the RAID group, the number of member disks, and a RAID level used by the RAID group. The faster the speeds of the member disks and the greater the number of member disks which serve as data disks, the greater the concurrent flushing upper limit of the RAID group is.

Optionally, if the number of dirty pages in the CACHE does not reach the high watermark, the number of concurrent flushing IOs of the RAID group in the current flushing can be determined according to the following formula:

$d_n = M \times (p_n/P) \times (1-U)$, where $d_n$ is the number of concurrent flushing IOs of the RAID group, and includes a total number of concurrent flushing IOs of all the logical units in the RAID group; M is the concurrent flushing upper limit of the RAID group; $p_n$ is the total number of dirty pages to be flushed to the RAID group; P is the total number of dirty pages to be flushed to the disk array; and U is a current utilization rate of the disk array.

It can be seen that, the greater a ratio of the total number of dirty pages to be flushed to a RAID group to the total number of dirty pages to be flushed to the disk array, the greater the number of concurrent flushing IOs of the RAID group; the lower the current utilization rate of the disk array, the greater the number of concurrent flushing IOs of each RAID group.

Step S230: Sequentially flush, according to the sequence of the logical units, concurrent flushing IOs of the RAID group to the logical units in the RAID group, where each concurrent flushing IO includes at least one dirty page to be flushed to one logical unit in the RAID group.

One concurrent flushing IO of a RAID group may include one or more dirty pages needing to be flushed to a same logical unit in the RAID group, one concurrent flushing IO of the RAID group can be construed as one flushing operation of flushing a dirty page in the concurrent flushing IO to the RAID group, and one concurrent flushing IO of the RAID group may include one or more dirty pages needing to be flushed to a same logical unit in the RAID group. Generally, dirty pages to be flushed to the RAID group are continuously packaged according to a sequence of destination addresses corresponding to the dirty pages, to form concurrent flushing IOs, and a destination address of a dirty page is corresponding to a physical address of a logical unit to which the dirty page is to be written. Flushing is separately performed on RAID groups, and during the flushing, the RAID groups do not interfere with each other. Concurrent flushing IOs in a RAID group are separately flushed to logical units of the RAID group according to a sequence. If the sequence is consistent with an arrangement sequence of physical addresses of the logical units in the RAID group, because the physical addresses of the logical units in the RAID group are consecutive, a process of flushing the concurrent flushing IOs of the RAID group to the RAID group is a process in which a magnetic arm in the RAID group performs sequential addressing and writes dirty pages to a disk.

According to the disk array flushing method provided in this embodiment of the present invention, by uniformly scheduling logical units in a single RAID group and performing flushing according to a sequence of physical addresses, it takes less time for a magnetic arm to jump back and forth for addressing, and influences between RAID groups are prevented by means of independent control over the RAID groups; in addition, by uniformly managing the number of concurrent flushing IOs of each RAID group at a RAID group layer, use rates of the RAID groups are balanced to a certain extent, thereby improving flushing efficiency of a disk array, and increasing throughput of the disk array.

Further, the sequentially flushing, according to the sequence of the logical units, concurrent flushing IOs of the RAID group to the logical units in the RAID group includes performing traversing from a current logical unit to which a flushing pointer of the RAID group points; and if the dirty pages to be flushed to the RAID group do not include a dirty page to be flushed to the current logical unit, pointing the flushing pointer of the RAID group to another logical unit that is arranged next to the current logical unit according to the sequence of the physical addresses; or if the dirty pages to be flushed to the RAID group include a dirty page to be flushed to the current logical unit, which indicates that a concurrent flushing IO corresponding to the current logical unit exists, flushing the current logical unit. In short, in a single RAID group, a flushing pointer may be set and is used to point to a logical unit from which a current flushing operation starts, that is, a logical unit at which a previous concurrent flushing operation ends. If during the flushing, the dirty pages to be flushed to the RAID group do not include a dirty page to be flushed to the current logical unit to which the flushing pointer points, which indicates that no concurrent flushing IO corresponding to the current logical unit exits, the flushing pointer is pointed to another logical unit, where the another logical unit is a logical unit that is arranged next to the current logical unit according to the sequence of the physical addresses, and the another logical unit is flushed. If the current logical unit is arranged at the end of the RAID group according to the sequence of the physical addresses, the flushing pointer is pointed to a logical unit that is arranged at the first place of the RAID group according to the sequence of the physical addresses.

Further, the flushing the current logical unit includes, if the number of completed concurrent flushing IOs of the current logical unit does not reach a concurrent flushing upper limit of the current logical unit, flushing a dirty page in a concurrent flushing IO corresponding to the current logical unit to the current logical unit; and if the number of completed concurrent flushing IOs of the current logical unit reaches the concurrent flushing upper limit of the current logical unit, stopping flushing the current logical unit, and pointing the flushing pointer of the RAID group to another logical unit that is arranged next to the current logical unit according to the sequence of the physical addresses. In short, before a dirty page in one concurrent flushing IO is flushed to the current logical unit, if it is determined that the number of completed concurrent flushing IOs of the current logical unit reaches the concurrent flushing upper limit of the current logical unit, flushing performed on the current logical unit is stopped, the flushing pointer is pointed to another logical unit, where the another logical unit is a logical unit that is arranged next to the current logical unit according to the sequence of the physical addresses, and the another logical unit is flushed.

Further, the flushing the current logical unit includes, if the number of completed concurrent flushing IOs of the RAID group does not reach the concurrent flushing upper limit of the RAID group, flushing the current logical unit; and if the number of completed concurrent flushing IOs of the RAID group reaches the concurrent flushing upper limit of the RAID group, stopping flushing the RAID group. Similarly, before a dirty page is flushed to the current logical unit, if it is determined that the number of completed concurrent flushing IOs of all the logical units in the RAID group reaches the number of concurrent flushing IOs of the logical units in the RAID group, that is, the current flushing on the RAID group is completed, the flushing pointer of the RAID group also stays at the current logical unit, and the current flushing on the RAID group is exited.

According to the disk array flushing method provided in this embodiment of the present invention, by uniformly scheduling logical units in a single RAID group and performing flushing according to a sequence of physical addresses, it takes less time for a magnetic arm to jump back and forth for addressing; an effect caused by a significant difference in the numbers of logical units of RAID groups is prevented by means of independent control over the RAID groups and by separately determining the number of concurrent flushing IOs of each RAID group according to a total number of dirty pages to be flushed to a disk array, a total number of dirty pages to be flushed to each RAID group, and a concurrent flushing upper limit of each RAID group, thereby improving flushing efficiency of the disk array, and increasing throughput of the disk array.

Figure 3:
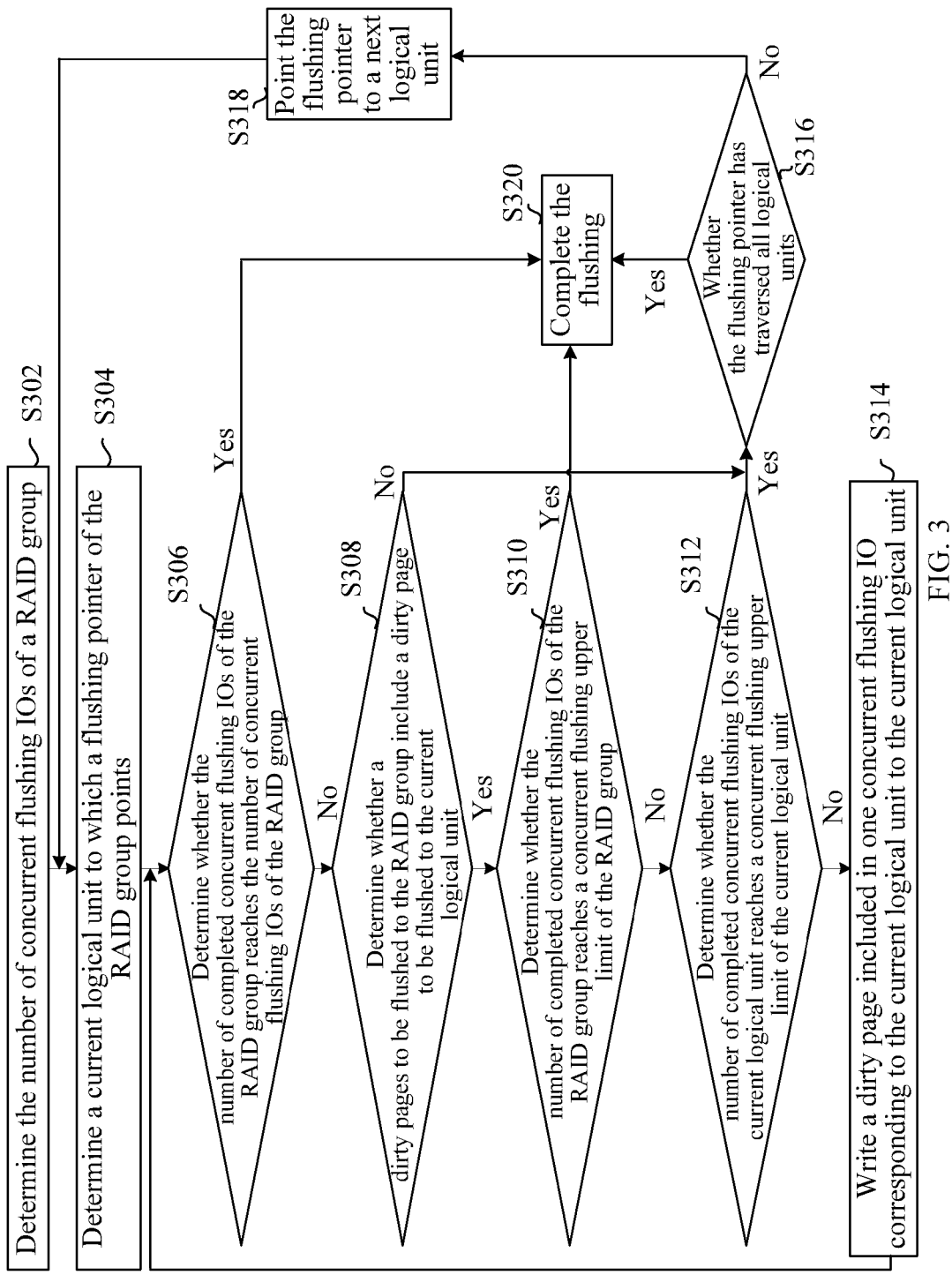
FIG. 3 is a flowchart of Embodiment 3 of a disk array flushing method according to the present invention.

FIG. 3 is a flowchart of Embodiment 3 of a disk array flushing method according to the present invention. As shown in FIG. 3, when used as a method for flushing a single RAID group, the disk array flushing method according to this embodiment may include:

Step S302: Determine the number of concurrent flushing IOs of a RAID group.

The number of concurrent flushing IOs of the RAID group may be determined according to a total number of dirty pages to be flushed to a disk array, a total number of dirty pages to be flushed to the RAID group, and a concurrent flushing upper limit of the RAID group.

Step S304: Determine a current logical unit to which a flushing pointer of the RAID group points.

In a single RAID group, a flushing pointer may be set and is used to point to a logical unit from which a current flushing operation starts, that is, a logical unit at which a previous concurrent flushing operation ends.

Step S306: Determine whether the number of completed concurrent flushing IOs of the RAID group reaches the number of concurrent flushing IOs of the RAID group; if yes, perform step S320, and if no, perform step S308.

Step S308: Determine whether dirty pages to be flushed to the RAID group include a dirty page to be flushed to the current logical unit; if yes, perform step S310, and if no, perform step S316.

Step S310: Determine whether the number of completed concurrent flushing IOs of the RAID group reaches a concurrent flushing upper limit of the RAID group; if yes, perform step S320, and if no, perform step S312.

Step S312: Determine whether the number of completed concurrent flushing IOs of the current logical unit reaches a concurrent flushing upper limit of the current logical unit; if yes, perform step S316, and if no, perform step S314.

Further, a concurrent flushing upper limit may also be set for each logical unit in the RAID group. Correspondingly, it can be determined whether the number of completed concurrent flushing IOs of the current logical unit to which the flushing pointer points reaches the concurrent flushing upper limit of the current logical unit.

Step S314: Write a dirty page included in one concurrent flushing IO corresponding to the current logical unit to the current logical unit, and return to step S306.

Before step S314, the method further includes packaging at least one dirty page corresponding to the current logical unit into one concurrent flushing IO corresponding to the current logical unit.

Step S316: Determine whether the flushing pointer has traversed all logical units; if yes, perform step 320, and if no, perform step S318.

All the logical units herein refer to all logical units in the RAID group.

Step S318: Point the flushing pointer to a next logical unit, and return to step S304.

The next logical unit is a logical unit that is arranged, according to a logical-block addressing sequence, next to the current logical unit to which the flushing pointer points. If the current logical unit is arranged at the end of the RAID group according to a sequence of physical addresses, the flushing pointer is pointed to a logical unit that is arranged at the first place of the RAID group according to the sequence of the physical addresses.

Step S320: Complete the flushing.

According to the disk array flushing method provided in this embodiment of the present invention, by using the foregoing steps, logical units in a single RAID group are uniformly scheduled and are flushed according to a sequence of physical addresses, and therefore it takes less time for a magnetic arm to jump back and forth for addressing; an effect caused by a significant difference in the numbers of logical units of RAID groups is prevented by means of independent control over the RAID groups and by separately determining the number of concurrent flushing IOs of each RAID group according to a total number of dirty pages to be flushed to a disk array, a total number of dirty pages to be flushed to each RAID group, and a concurrent flushing upper limit of each RAID group.

Figure 4:
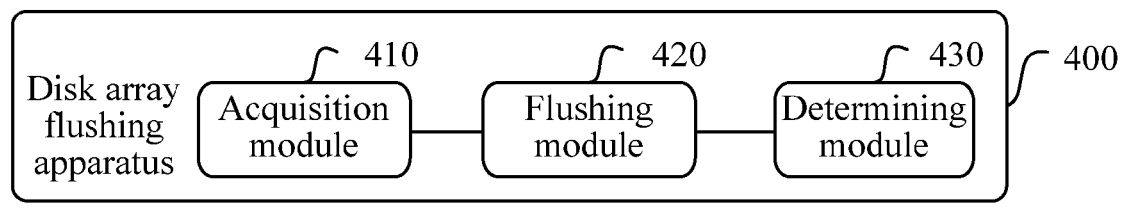
FIG. 4 is a schematic structural diagram of Embodiment 1 of a disk array flushing apparatus according to the present invention.

FIG. 4 is a schematic structural diagram of Embodiment 1 of a disk array flushing apparatus according to the present invention. As shown in FIG. 4, a disk array flushing apparatus 400 according to this embodiment may include an acquisition module 410, which may be configured to acquire a sequence, which is according to physical addresses of logical units, of the logical units in a same RAID group in a disk array; and a flushing module 420, which may be configured to sequentially flush, according to the sequence of the logical units, concurrent flushing IOs of the RAID group to the logical units in the RAID group, where each concurrent flushing IO includes at least one dirty page to be flushed to one logical unit in the RAID group.

Further, the disk array flushing apparatus 400 may include a determining module 430 configured to determine the number of concurrent flushing IOs of the RAID group according to a total number of dirty pages to be flushed to the disk array, a total number of dirty pages to be flushed to the RAID group, and a concurrent flushing upper limit of the RAID group.

Further, the determining module 430 may be configured to determine the number $d_n = M \times (p_n/P) \times (1-U)$ of concurrent flushing IOs of the RAID group, where M is the concurrent flushing upper limit of the RAID group, $p_n$ is the total number of dirty pages to be flushed to the RAID group, P is the total number of dirty pages to be flushed to the disk array, and U is a current utilization rate of the disk array.

Further, the flushing module 420 may be configured to perform traversing from a current logical unit to which a flushing pointer of the RAID group points; and if the dirty pages to be flushed to the RAID group do not include a dirty page to be flushed to the current logical unit, point the flushing pointer of the RAID group to another logical unit that is arranged next to the current logical unit according to the sequence of the physical addresses; or if the dirty pages to be flushed to the RAID group include a dirty page to be flushed to the current logical unit, flush the current logical unit.

Further, that the flushing module 420 is configured to flush the current logical unit may include, if the number of completed concurrent flushing IOs of the current logical unit does not reach a concurrent flushing upper limit of the current logical unit, flushing a dirty page in a concurrent flushing IO corresponding to the current logical unit to the current logical unit; and if the number of completed concurrent flushing IOs of the current logical unit reaches the concurrent flushing upper limit of the current logical unit, stopping flushing the current logical unit, and pointing the flushing pointer of the RAID group to another logical unit that is arranged next to the current logical unit according to the sequence of the physical addresses.

Further, the flushing module 420 may be configured to, if the number of completed concurrent flushing IOs of the RAID group does not reach the concurrent flushing upper limit of the RAID group, flush the current logical unit; and if the number of completed concurrent flushing IOs of the RAID group reaches the concurrent flushing upper limit of the RAID group, stop flushing the RAID group.

Further, the flushing module 420 may be configured to keep the flushing pointer of the RAID group unchanged.

The disk array flushing apparatus 400 provided in this embodiment may be used to implement the technical solution of any method embodiment shown in FIG. 1 to FIG. 3, and an implementation principle and technical effects of the disk array flushing apparatus 400 are similar to those of the method embodiment and are not described herein again.

Figure 5:
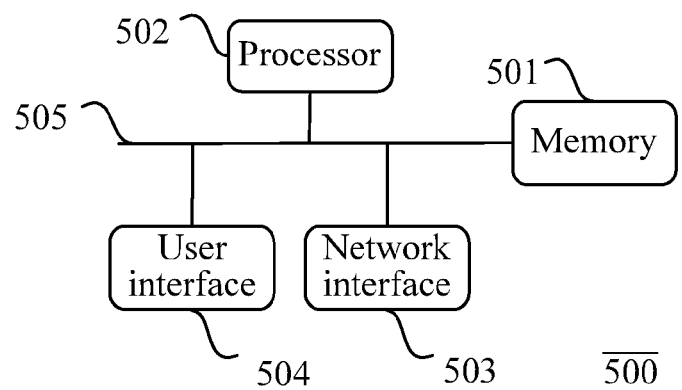
FIG. 5 is a schematic structural diagram of Embodiment 2 of a disk array flushing apparatus according to the present invention.

FIG. 5 is a schematic structural diagram of Embodiment 2 of a disk array flushing apparatus according to the present invention. As shown in FIG. 5, a disk array flushing apparatus 500 includes: a memory 501 configured to store an instruction; and a processor 502, coupled to the memory, where the processor 502 is configured to execute the instruction stored in the memory 501; the disk array flushing apparatus 500 may further include a network interface 503, another user interface 504, and a communications bus 505. The communications bus 505 is configured to implement connection and communication between these apparatuses. The memory 501 may include a high-speed random access memory (RAM), or may further include a non-volatile memory, for example, at least one magnetic disk memory. The memory 501 may optionally include at least one storage apparatus located far away from the foregoing processor 502.

The processor 502 is configured to acquire a sequence, which is according to physical addresses of logical units, of the logical units in a same RAID group in a disk array; and sequentially flush, according to the sequence of the logical units, concurrent flushing IOs of the RAID group to the logical units in the RAID group, where each concurrent flushing IO includes at least one dirty page to be flushed to one logical unit in the RAID group.

Further, the processor 502 is configured to determine the number of concurrent flushing IOs of the RAID group according to a total number of dirty pages to be flushed to the disk array, a total number of dirty pages to be flushed to the RAID group, and a concurrent flushing upper limit of the RAID group.

Further, the processor 502 is configured to determine the number $d_n = M \times (p_n/P) \times (1-U)$ of concurrent flushing IOs of the RAID group, where M is the concurrent flushing upper limit of the RAID group, $p_n$ is the total number of dirty pages to be flushed to the RAID group, P is the total number of dirty pages to be flushed to the disk array, and U is a current utilization rate of the disk array.

Further, the processor 502 is configured to perform traversing from a current logical unit to which a flushing pointer of the RAID group points; and if the dirty pages to be flushed to the RAID group do not include a dirty page to be flushed to the current logical unit, point the flushing pointer of the RAID group to another logical unit that is arranged next to the current logical unit according to the sequence of the physical addresses; or if the dirty pages to be flushed to the RAID group include a dirty page to be flushed to the current logical unit, flush the current logical unit.

Further, that the processor 502 is configured to flush the current logical unit includes, if the number of completed concurrent flushing IOs of the current logical unit does not reach a concurrent flushing upper limit of the current logical unit, flushing a dirty page in a concurrent flushing IO corresponding to the current logical unit to the current logical unit; and if the number of completed concurrent flushing IOs of the current logical unit reaches the concurrent flushing upper limit of the current logical unit, stopping flushing the current logical unit, and pointing the flushing pointer of the RAID group to another logical unit that is arranged next to the current logical unit according to the sequence of the physical addresses.

Further, the processor 502 is configured to, if the number of completed concurrent flushing IOs of the RAID group does not reach the concurrent flushing upper limit of the RAID group, flush the current logical unit; and if the number of completed concurrent flushing IOs of the RAID group reaches the concurrent flushing upper limit of the RAID group, stop flushing the RAID group.

Further, the processor 502 is configured to keep the flushing pointer of the RAID group unchanged.

The disk array flushing apparatus 500 provided in this embodiment may be used to implement the technical solution of any method embodiment shown in FIG. 1 to FIG. 3, and an implementation principle and technical effects of the disk array flushing apparatus 500 are similar to those of the method embodiment and are not described herein again. FIG. 5 is merely one schematic diagram of a structure of a disk array flushing apparatus according to the present invention, and a specific structure may be adjusted according to actual requirements.

To sum up, according to the disk array flushing method and the disk array flushing apparatus provided in the embodiments of the present invention, by uniformly scheduling logical units in a single RAID group and performing flushing according to a sequence of physical addresses, it takes less time for a magnetic arm to jump back and forth for addressing, and influences between RAID groups are prevented by means of independent control over the RAID groups; in addition, by balancing the numbers of flushing IOs of the RAID groups at a RAID group layer, use rates of the RAID groups are balanced to a certain extent, thereby improving flushing efficiency of a disk array, and increasing throughput of the disk array.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A disk array flushing method, comprising:
acquiring, according to physical addresses of logical units, a sequence of the logical units in the same redundant array of independent disks (RAID) group in a disk array; and
sequentially flushing, according to the sequence of the logical units, concurrent flushing inputs/outputs (IOs) of the RAID group to the logical units in the RAID group, wherein each concurrent flushing IO comprises at least one dirty page to be flushed to one of the logical units in the RAID group,
wherein sequentially flushing the concurrent flushing IOs of the RAID group to the logical units in the RAID group comprises:
performing traversing from a current logical unit to which a flushing pointer of the RAID group points, wherein the current logical unit is a logical unit from which a current flushing operation starts;
pointing the flushing pointer of the RAID group to another logical unit that is arranged next to the current logical unit according to the sequence of the physical addresses when the dirty pages to be flushed to the RAID group do not comprise a dirty page to be flushed to the current logical unit; and
flushing on the current logical unit when the dirty pages to be flushed to the RAID group comprise a dirty page to be flushed to the current logical unit.

2. The method according to claim 1, wherein before sequentially flushing the concurrent flushing IOs of the RAID group to the logical units in the RAID group, the method further comprises determining the number of the concurrent flushing IOs of the RAID group according to a total number of dirty pages to be flushed to the disk array, a total number of dirty pages to be flushed to the RAID group, and a concurrent flushing upper limit of the RAID group.

3. The method according to claim 2, wherein determining the number of the concurrent flushing IOs of the RAID group comprises determining the number of the concurrent flushing IOs of the RAID group ($d_n$) using $d_n = M \times (p_n/P) \times (1-U)$, wherein M is the concurrent flushing upper limit of the RAID group, wherein $p_n$ is the total number of the dirty pages to be flushed to the RAID group, wherein P is the total number of the dirty pages to be flushed to the disk array, and wherein U is a current utilization rate of the disk array.

4. The method according to claim 1, wherein flushing on the current logical unit comprises:
flushing a dirty page in a concurrent flushing IO corresponding to the current logical unit to the current logical unit when the number of completed concurrent flushing IOs of the current logical unit does not reach a concurrent flushing upper limit of the current logical unit;
stopping flushing on the current logical unit; and
pointing the flushing pointer of the RAID group to another logical unit that is arranged next to the current logical unit according to the sequence of the physical addresses when the number of the completed concurrent flushing IOs of the current logical unit reaches the concurrent flushing upper limit of the current logical unit.

5. The method according to claim 1, wherein flushing on the current logical unit comprises:
flushing on the current logical unit when the number of completed concurrent flushing IOs of the RAID group does not reach the concurrent flushing upper limit of the RAID group; and
stopping flushing on the RAID group when the number of the completed concurrent flushing IOs of the RAID group reaches the concurrent flushing upper limit of the RAID group.

6. The method according to claim 5, wherein after stopping flushing on the RAID group, the method further comprises keeping the flushing pointer of the RAID group unchanged.

7. A disk array flushing apparatus, comprising:
a processor; and
a non-transitory computer readable medium comprising computer-executable instructions,
wherein the processor is configured to execute the computer-executable instructions to:
acquire, according to physical addresses of logical units, a sequence of the logical units in the same redundant array of independent disks (RAID) group in a disk array; and
sequentially flush, according to the sequence of the logical units, concurrent flushing inputs/outputs (IOs) of the RAID group to the logical units in the RAID group, wherein each of the concurrent flushing IOs comprises at least one dirty page to be flushed to one of the logical units in the RAID group, and wherein sequentially flushing concurrent flushing IOs of the RAID group to the logical units in the RAID group comprises:

performing traversing from a current to logical unit to which a flushing pointer of the RAID group points, wherein the current logical unit is a logical unit from which a current flushing operation starts;

pointing the flushing pointer of the RAID group to another logical unit that is arranged next to the current logical unit according to the sequence of the physical addresses when the dirty pages to be flushed to the RAID group do not comprise a dirty page to be flushed to the current logical unit; and flushing on the current logical unit when the dirty pages to be flushed to the RAID group comprise a dirty page to be flushed to the current logical unit.

8. The apparatus according to claim 7, wherein before sequentially flushing the concurrent flushing IOs of the RAID group to the logical units in the RAID group, the processor is further configured to execute the computer-executable instructions to determine the number of the concurrent flushing IOs of the RAID group according to a total number of dirty pages to be flushed to the disk array, a total number of dirty pages to be flushed to the RAID group, and a concurrent flushing upper limit of the RAID group.

9. The apparatus according to claim 7, wherein flushing on the current logical unit comprises:

flushing a dirty page in a concurrent flushing IO corresponding to the current logical unit to the current logical unit when the number of completed concurrent flushing IOs of the current logical unit does not reach a concurrent flushing upper limit of the current logical unit; and stopping flushing on the current logical unit, and pointing the flushing pointer of the RAID group to another logical unit that is arranged next to the current logical unit according to the sequence of the physical addresses when the number of the completed concurrent flushing IOs of the current logical unit reaches the concurrent flushing upper limit of the current logical unit.

10. The apparatus according to claim 7, wherein flushing on the current logical unit comprises:

flushing on the current logical unit when the number of completed concurrent flushing IOs of the RAID group does not reach the concurrent flushing upper limit of the RAID group; and stopping flushing on the RAID group when the number of the completed concurrent flushing IOs of the RAID group reaches the concurrent flushing upper limit of the RAID group.

11. The apparatus according to claim 10, wherein the processor is further configured to execute the computer-executable instructions to keep the flushing pointer of the RAID group unchanged after stopping flushing on the RAID group.

12. A disk array flushing apparatus, comprising:
a processor; and
a non-transitory computer readable medium comprising computer-executable instructions,
wherein the processor is configured to execute the-executable instructions to:

acquire, according to physical addresses of logical units, a sequence of the logical units in the same redundant array of independent disks (RAID) group in a disk array;

determine the number of the concurrent flushing IOs of the RAID group ($d_n$) using $d_n = M \times (p_n/P) \times (1-U)$, wherein M is a concurrent flushing upper limit of the RAID group, wherein $p_n$ is a total number of dirty pages to be flushed to the RAID group, wherein P is a total number of dirty pages to be flushed to the disk array, and wherein U is a current utilization rate of the disk array; and sequentially flush, according to the sequence of the logical units, concurrent flushing inputs/outputs (IOs) of the RAID group to the logical units in the RAID group, wherein each of the concurrent flushing IOs comprises at least one dirty page to be flushed to one of the logical units in the RAID group.

13. The apparatus according to claim 12, wherein sequentially flushing concurrent flushing IOs of the RAID group to the logical units in the RAID group comprises:

performing traversing from a current logical unit to which a flushing pointer of the RAID group points, wherein the current logical unit is a logical unit from which a current flushing operation starts;

pointing the flushing pointer of the RAID group to another logical unit that is arranged next to the current logical unit according to the sequence of the physical addresses when the dirty pages to he flushed to the RAID group do not comprise a dirty page to be flushed to the current logical unit; and flushing on the current logical unit when the dirty pages to be flushed to the RAID group comprise a dirty page to be flushed to the current logical unit.

14. The apparatus according to claim 13, wherein flushing on the current logical unit comprises:

flushing a dirty page in a concurrent flushing IO corresponding to the current logical unit to the current logical unit when the number of completed concurrent flushing IOs of the current logical unit does not reach a concurrent flushing upper limit of the current logical unit; and stopping flushing on the current logical unit, and pointing the flushing pointer of the RAID group to another logical unit that is arranged next to the current logical unit according to the sequence of the physical addresses when the number of the completed concurrent flushing IOs of the current logical unit reaches the concurrent flushing upper limit of the current logical unit.

15. The apparatus according to claim 13, wherein flushing on the current logical unit comprises:

flushing on the current logical unit when the number of completed concurrent flushing IOs of the RAID group does not reach the concurrent flushing upper limit of the RAID group; and stopping flushing on the RAID group when the number of the completed concurrent flushing IOs of the RAID group reaches the concurrent flushing upper limit of the RAID group.

16. The apparatus according to claim 15, wherein the processor is further configured to execute the computer-executable instructions to keep the flushing pointer of the RAID group unchanged after stopping flushing on the RAID group.

\* \* \* \* \*

UNITED STATES PATENT AND TRADEMARK OFFICE
CERTIFICATE OF CORRECTION

PATENT NO. : 9,582,433 B2  
APPLICATION NO. : 14/752077  
DATED : February 28, 2017  
INVENTOR(S) : Xiang Zhang, Hao Dong and Quan Li Page 1 of 1

It is certified that error appears in the above-identified patent and that said Letters Patent is hereby corrected as shown below:

In the Claims

Column 15, Line 65-66, Claim 12 should read:
wherein the processor is configured to execute the computer-executable instructions to:

Signed and Sealed this
Twenty-third Day of May, 2017

Michelle K. Lee
*Director of the United States Patent and Trademark Office*